United States Patent [19]

Turcotte et al.

[11] 4,020,348
[45] Apr. 26, 1977

[54] GANTRY SCANNING CAMERA

[75] Inventors: Ronald E. Turcotte, Ridgefield, Conn.; Jay R. Wolff, Highland Park, Ill.; Anthony P. Del Medico, Niles, Ill.; Paul C. Lee, Palatine, Ill.

[73] Assignee: G. D. Searle & Co., Skokie, Ill.

[22] Filed: May 12, 1975

[21] Appl. No.: 576,357

[52] U.S. Cl. .................. 250/363 S; 250/522
[51] Int. Cl.² ................................ G01T 1/166
[58] Field of Search .......... 250/363 S, 522, 523

[56] References Cited

UNITED STATES PATENTS

| | | | |
|---|---|---|---|
| 2,737,596 | 3/1956 | Haupt et al. | 250/523 |
| 3,428,805 | 2/1969 | Donato et al. | 250/363 S |
| 3,541,334 | 11/1970 | Sobolewski | 250/523 |
| 3,714,427 | 1/1973 | Reiniger et al. | 250/523 |
| 3,852,601 | 12/1974 | Casale | 250/363 S |
| 3,870,886 | 3/1975 | Casale | 250/363 S |
| 3,899,675 | 8/1975 | Floyd | 250/363 S |

*Primary Examiner*—Archie R. Borchelt
*Attorney, Agent, or Firm*—Walter C. Ramm; Peter J. Sgarbossa; Helmuth A. Wegner

[57] ABSTRACT

A scintillation camera is suspended from an elevated gantry and is laterally movable. Sensors detecting the lateral position of the scintillation camera detector head produce signals which are combined with the detector head output signals to produce an image reflecting the occurrence of radioactive events within an expanded rectilinear field of view of the detector head. This image is stored using a recording medium.

18 Claims, 5 Drawing Figures

GANTRY SCANNING CAMERA

This invention relates to a scintillation camera employing a detector head laterally movable suspended from an elevated gantry. Lateral position sensors transmit signals which are combined with the position signals from the scintillation camera head. The composite signals are passed to a recording unit to store an image reflecting the locations at which radioactive events occur within an expanded rectilinear field of view bounded by predetermined limits. The limits bear a direct relationship to the extreme positions of lateral displacement which the detector head is allowed to assume during a period of operation.

BACKGROUND OF THE INVENTION

The use of scintillation cameras for medical diagnosis in nuclear medicine is an established field of medical instrumentation technology. A form of scintillation camera employing a detector head utilizing a planar scintillation crystal for detecting the occurrence of radioactive emissions and having an image recordation means for storing information representing the interaction of radioactive emissions relative to the scintillation crystal in a two-dimensional coordinate system encompassing the crystal is described in U.S. Pat. No. 3,057,011. The advent of such scintillation cameras complemented to some extent and displaced to a large extent the use of scintillation scanners. Conventional radioisotope scanning is described at pages 27 and 28 of the article "Radiation and Medicine" published in the January/February, 1965 issue of Atomics, Volume 18, Number 1. In addition to more conventional scanners, scintillation cameras have even been used as scanning devices for particular purposes. A scintillation camera used for tomographic scanning, for example, is described in a University of California Report UCRL-16899, published May 31, 1966. A variation of the scanning scintillation camera is a scanning platform. Such a system is described in an article by Michael B. D. Cooke and Ervin Kaplan, entitled "Whole-Body Imaging and Count Profiling with a Modified Anger Camera", Journal of Nuclear Medicine, Vol. 13, No. 12, December, 1972, pp. 899–907. In the utilization of a scanning platform, a patient is positioned on the platform and the platform is moved laterally beneath a fixed scintillation camera detector head.

The object of the present invention is to alleviate certain problems and difficulties that exist in conventional systems. Using the overhead gantry system of this invention, a great deal less room is required for whole body imaging as compared with a scanning platform arrangement. That is, it is necessary to move only a scintillation detector head approximately 18 inches in diameter over an area having dimensions of approximately 8 feet by 4 feet. This is in contrast to the required motion of a scanning platform which necessitates moving the entire area of a 4 foot by 8 foot platform past a fixed scintillation camera detector head. Also, it is far easier for hospital personnel to attend to a patient situated in a stationary position than on a moving table. The motion of a scanning platform further poses obstacles to the positioning of equipment or instruments proximate to a patient on the platform. Using the present invention, the difficulties cited are obviated while retaining the capability for whole body imaging.

The preferred embodiment of the invention illustrated herein provides several further advantages. A portion of the conventional disc-shaped scintillation crystal is masked so that only a rectangular section of the scintillation crystal contributes recordable information. This ensures a uniformity of contribution to the image produced from all areas of a patient which are scanned by eliminating the integration of detected radioactive events from areas where non-uniform overlapping viewing would otherwise occur using a circular or disc-like scintillation detector. With essentially the same consideration in mind, the emission registration portion of the scintillation detector is passed entirely beyond the boundary limits of the field of interest when the detector head undergoes a change in direction of lateral translational motion during scanning. The peripheral portions of the field of interest are thereby exposed to the emission sensitive portion of the scintillation detector to the same extent as are the interior portions of the field of interest. Thus the imaging information derived from the peripheral portions of the field of interest has the same reliability as information derived from more central regions of the field of interest.

Preferably, the scanning mechanism of this invention is provided with an automatic speed control which is regulated by a feedback signal derived from the position sensors. It is thereby possible to balance the requirement for maximizing the number of detected radioactive events with the desirability of concluding an imaging study as rapidly as possible. Speed is maintained at a uniform pace within the viewing area, but the detector head is cushioned in its movement by controlling the acceleration and deceleration profiles both at the beginning and at the termination of any scanning pass of the detector through the viewing area. In this manner, position information inaccuracy in imaging due to mechanical backlash is minimized.

Another advantageous feature of the peferred embodiment of the invention is the ability to adjust the spacing between scanning passes. This is accomplished by providing an indexing selection by which the emission registration portion of the scintillation crystal views overlapping, contiguous, or separated segments of the field of view when moving in adjacent scanning paths. There is also a scanning pass control associated with the index selection unit. The scanning pass control determined the number of scanning passes which the detector head will traverse. Moreover, in conjunction with the variable dimensions of the field of view from which information may be tabulated, automatic adjustments are made to the displayed image so that an undistorted image of maximum size will be produced for any dimensions of the field of view selected. This is advantageously accomplished by automatically associating the proper degree of minification with the dimensions of the field of view selected.

Certain features of safety are provided as elements of the preferred embodiment of the invention. These include a telescoping detector head suspension unit provided with a balancing arm which automatically adjusts for variations in the weight of the detector head. Such variations typically arise since interchangeable collimators of different weight are selectively attached to the detector head. Also, the translation inducing portion of the scanning mechanism is provided with clutch assemblies so that excessive resistance to movement of the detector head will cause disengagement of the motion inducing mechanism. Furthermore, an electrical sensing device in the system limits maximum motor torque in the translation inducing mechanism.

SUMMARY OF THE INVENTION

In a broad aspect this invention is a gantry supported scanning scintillation camera system comprising: a scintillation camera employing a movable detector head and detached signal processing and image recording means, an elevated gantry support from which said detector head is suspended, translation inducing means for laterally moving said detector head within a viewing area to define an expanded rectilinear field of view bounded by predetermined limits whereby said detector head views a segment of said viewing area which varies with the lateral position of said detector head, detector position sensing means for generating electrical signals corresponding to the lateral position of said detector head within said viewing area, and signal combining means receiving input signals from said signal processing unit and from said detector position sensing means to provide composite output signals to said image recording means representing the locations within said expanded field of view from which radiation emanates.

BRIEF DESCRIPTION OF THE INVENTION

A preferred embodiment of the scanning gantry camera of this invention is illustrated in the accompanying drawings in which:

FIG. 1 is a perspective configuration of the basic supporting unit,

FIG. 2 is an elevational view of the detector head and detector suspension device, with a carriage supporting the detector head illustrated in section, FIG. 3 is an elevational view in partial section depicting the carriage support, FIG. 4 is a diagram of the electronic controls of the invention, FIG. 5 is a plan view looking upward from beneath the structure and illustrating the scanning pattern of the invention.

DETAILED DESCRIPTION OF THE INVENTION

Figure 1:
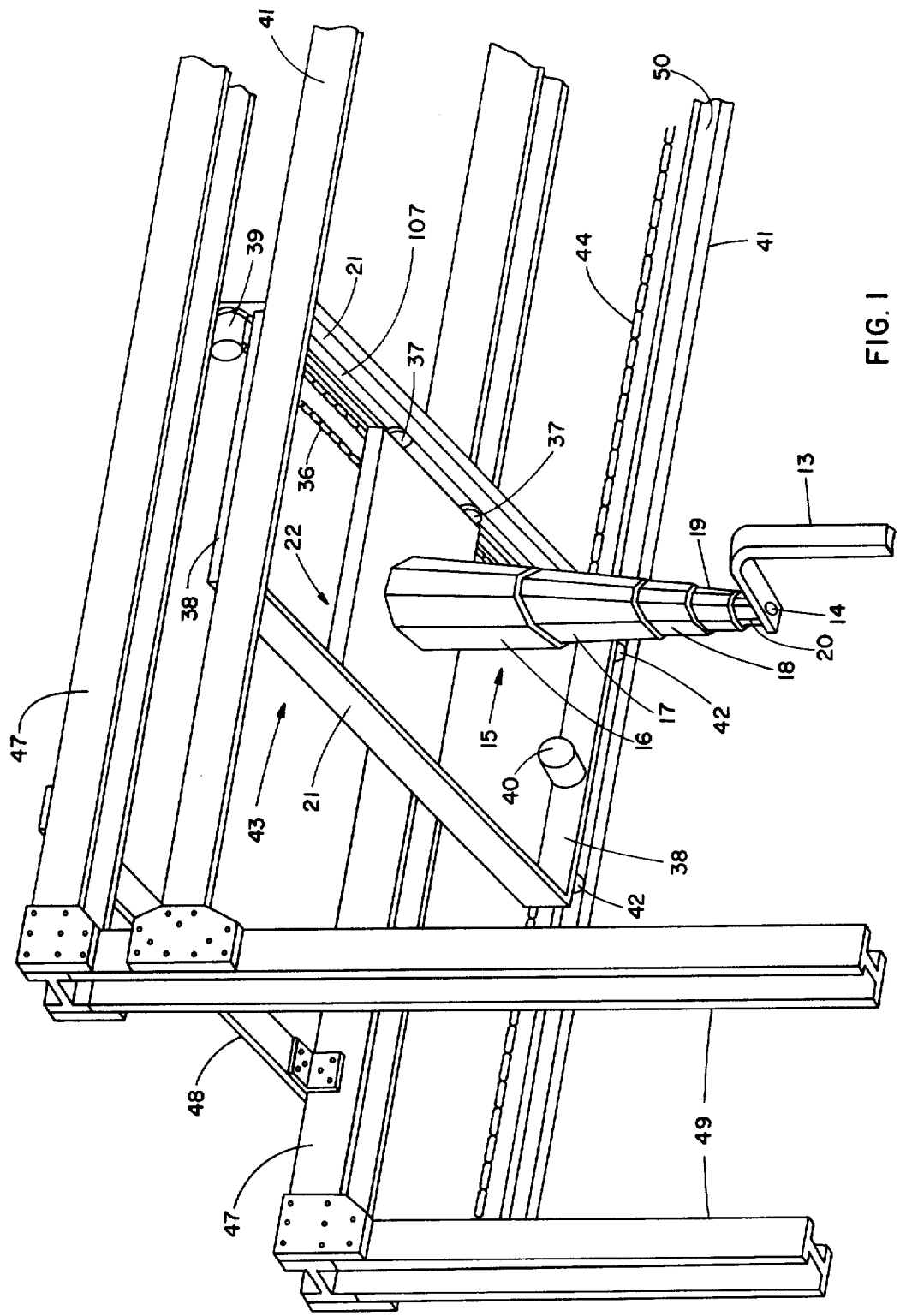

Referring now to the drawings, and with particular regard to FIG. 1, there is illustrated an elevated gantry support structure for a scanning scintillation camera system. Only one end of the gantry support is illustrated in FIG. 1, but it is to be understood that the opposite end involves corresponding structural elements. In the gantry support system illustrated, a pair of upright I-beams 49 are fastened by gusset plates to a pair of overhead I-beams 47 which are in turn interconnected by cross members 48 by means of steel angles. Also fastened to the upright supports 49 are a pair of parallel longitudinal rails 41. As is apparent from FIGS. 1 and 3, the interior surface of each of the rails 41 is provided with a longitudinally extending channel 50 which accommodates the passage therethrough of rollers 42. A carriage support assembly 43 spans the distance between the longitudinal rails 41. The carriage support means 43 is supported by the elevated framework and is longitudinally positionable with respect to the rails 41. The carriage support assembly 43 is comprised of a pair of parallel rails 21 transverse with respect to the longitudinal rails 41 are connected together by end members 38. The rollers 42 fasten to the end members 38, move within the channels 50 and enable longitudinal positioning of the carriage support assembly 43.

Figure 2:
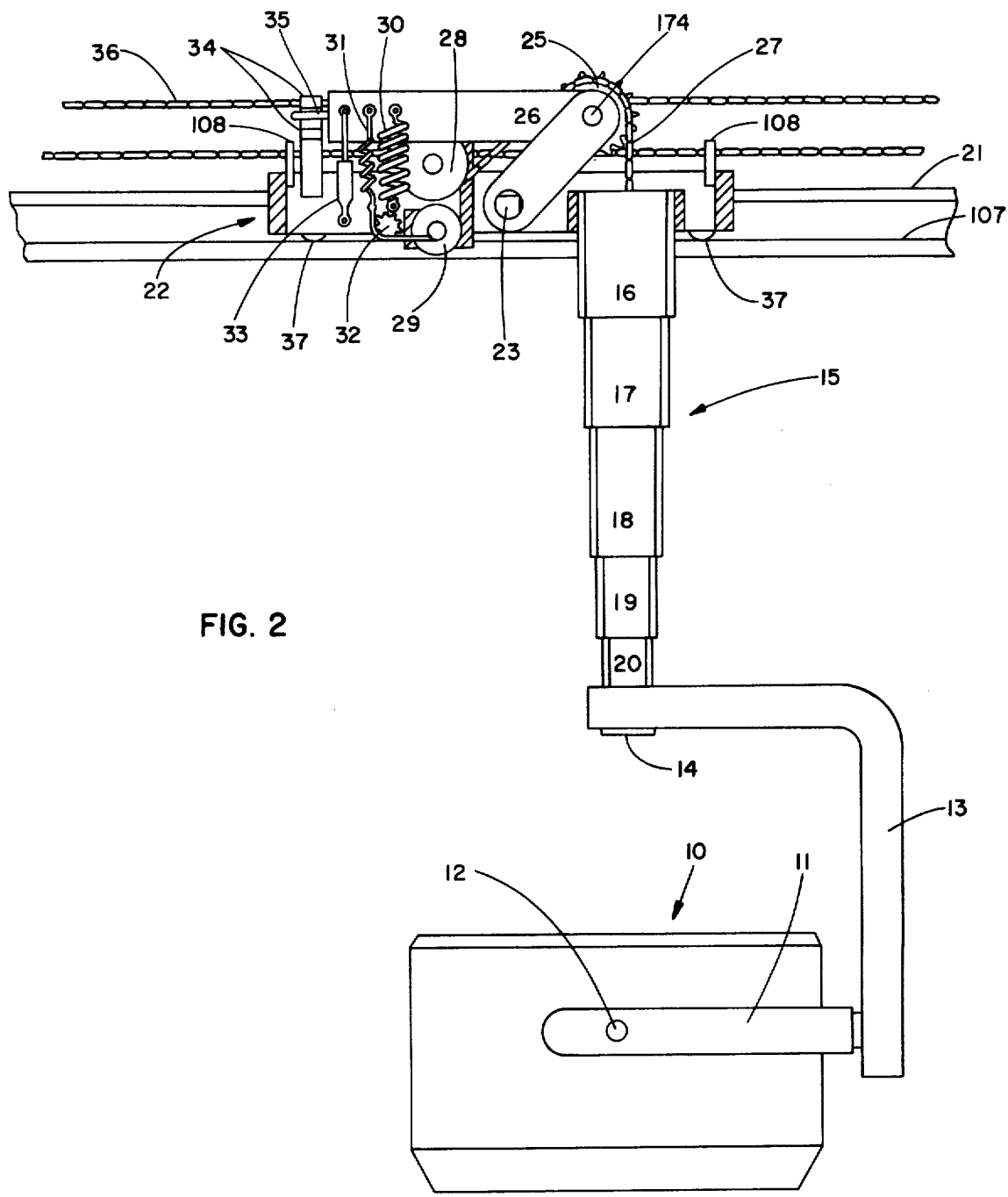

The transverse rails 21 are similar in design to the longitudinal rails 41. That is, the interior faces of the transverse rails 21 are provided with channels 107 extending the length thereof and accommodating rollers 37 which are mounted on a transversely positionable carriage 22. The carriage 22 is supported by and positionable lengthwise with respect to the carriage support means 43 by means of the rollers 37 which are engaged by the channels 107. A detector suspension means 15 is interposed between the detector head 10 (as best illustrated in FIG. 2) and the carriage 22. The detector suspension means 15 is comprised of a yoke 11 within which the scintillation detector head 10 is rotatably mounted, an intermediate supporting L-shaped structure 13, and a vertically extensible telescoping column having segments 16, 17, 18, 19 and 20. The structure 13 is a support for the detector head 10 interposed between the column and the yoke 11 and is rotatable about the axis of the column by means of a load bearing pin 14 rotatable within and supported by the column segment 20. Structure 13 has a laterally extending portion to allow the detector head 10 to be positioned both above and below a patient positioned on the patient support table 212 beneath the gantry support. By employing the L-shaped frame 13, the yoke 11 and the detector head 10 are shaped and assembled such that the gantry scanning camera is capable of laterally scanning a patient from above or beneath. As illustrated in FIG. 2, a suspension chain 27 passes down through the upper segments of the column and is attached to the segment 20. Chain 27 passes over a gear 25 rotatably supported on a lever arm 24 and is wound on a take up reel which forms an integral part of a motor 28. The motor 28 is equipped with a locking feature which prevents rotation of the take up drum unless the motor 28 is actuated. This forms an immobilizing means for locking the column at a selected length. Vertical adjustment of the height of the detector head 10 is provided by reeling in or letting out chain 27 by operation of motor 28. This permits optimal positioning of the detector head 10 for scanning either above or below a patient positioned on the table 212.

The scintillation camera system employed is of a type in which the detector head 10 is detached from the pulse processing unit 51 and from the image recording unit 56. The scintillation detector head 10 employs a planar scintillation crystal for detecting radioactive events and for generating light emissions in response thereto. A plurality of photodetectors (in the form of photomultiplier tubes) in optical communication with overlapping areas of said scintillation crystal generate electrical pulses in response to the received light emissions, and pulse amplification circuitry is provided for amplifying pulses from said photodetectors. The pulse processing unit 51 employs matrixing circuitry for producing electrical output position signals representing the locations within the scintillation crystal from which light emissions emanate in a two dimensional coordinate system encompassing the scintillation crystal. The image recordation means 56 stores information representing the interaction of radioactive emissions relative to the scintillation crystal in a two dimensional coordinate system encompassing the scintillation crystal. As previously indicated, such a scintillation camera system is illustrated in U.S. Pat. No. 3,011,057.

Figure 3:
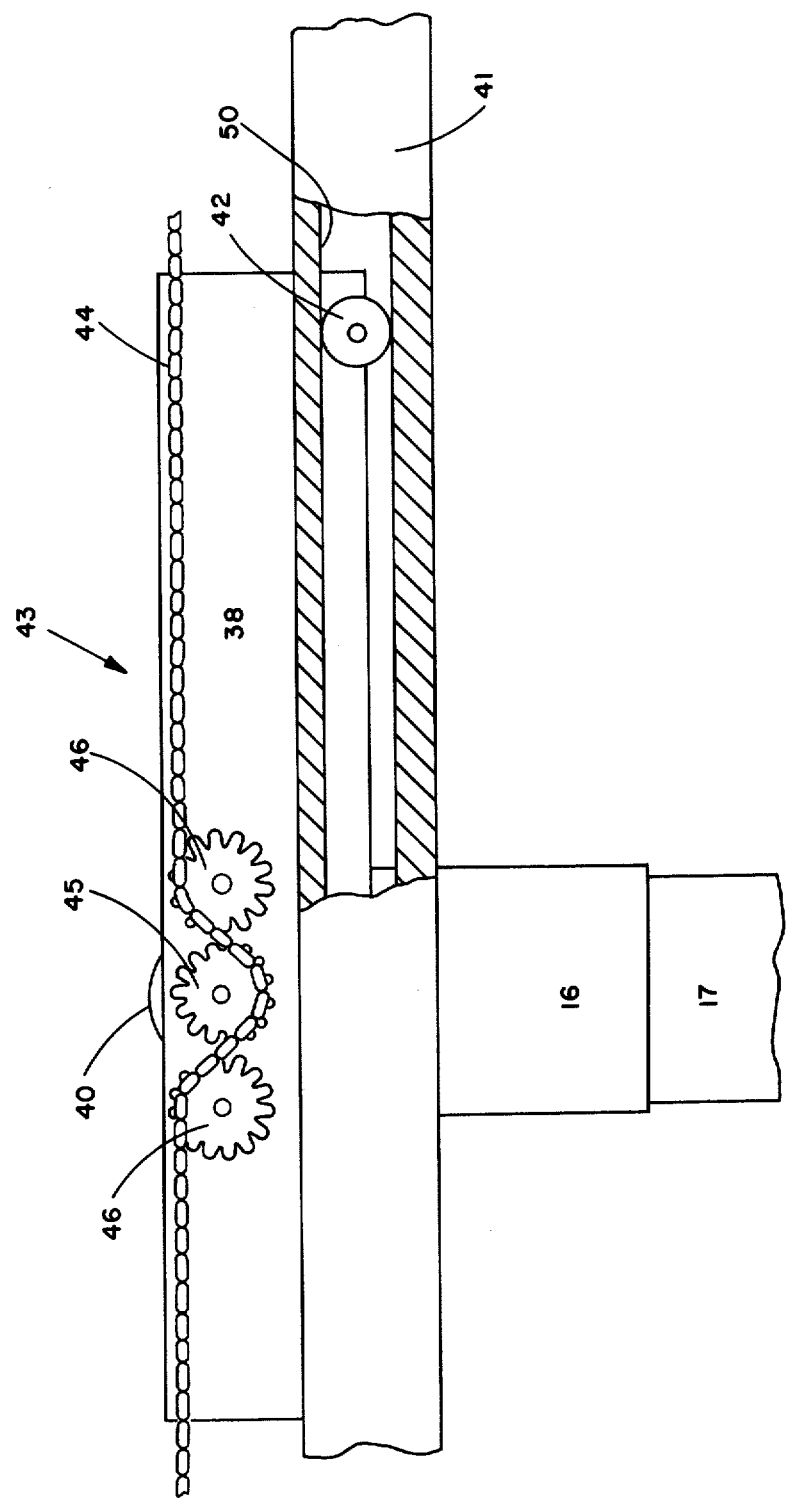

In addition to the gantry supporting system there is also provided a translation inducing or actuating means which is operably connected to move the carriage support 43, the carriage 22, and the detector suspension means 15 (and hence the detector head 10) in mutually perpendicular directions. The translation inducing means is formed of several motor drive units. A chain 44 extends lengthwise parallel to one of the longitudinal rails 41. As illustrated in FIG. 3, the chain 44 is engaged by a driving gear 45 connected to the shaft of a motor 40 through a gear box. The chain 44 is carried over idler gears 46 to ensure full engagement by the driving gear 45. Longitudinal movement of the carriage support 43 is thereby effected by actuation of the motor 40, which may be operated to rotate the driving gear 45 in either direction.

Figure 4:
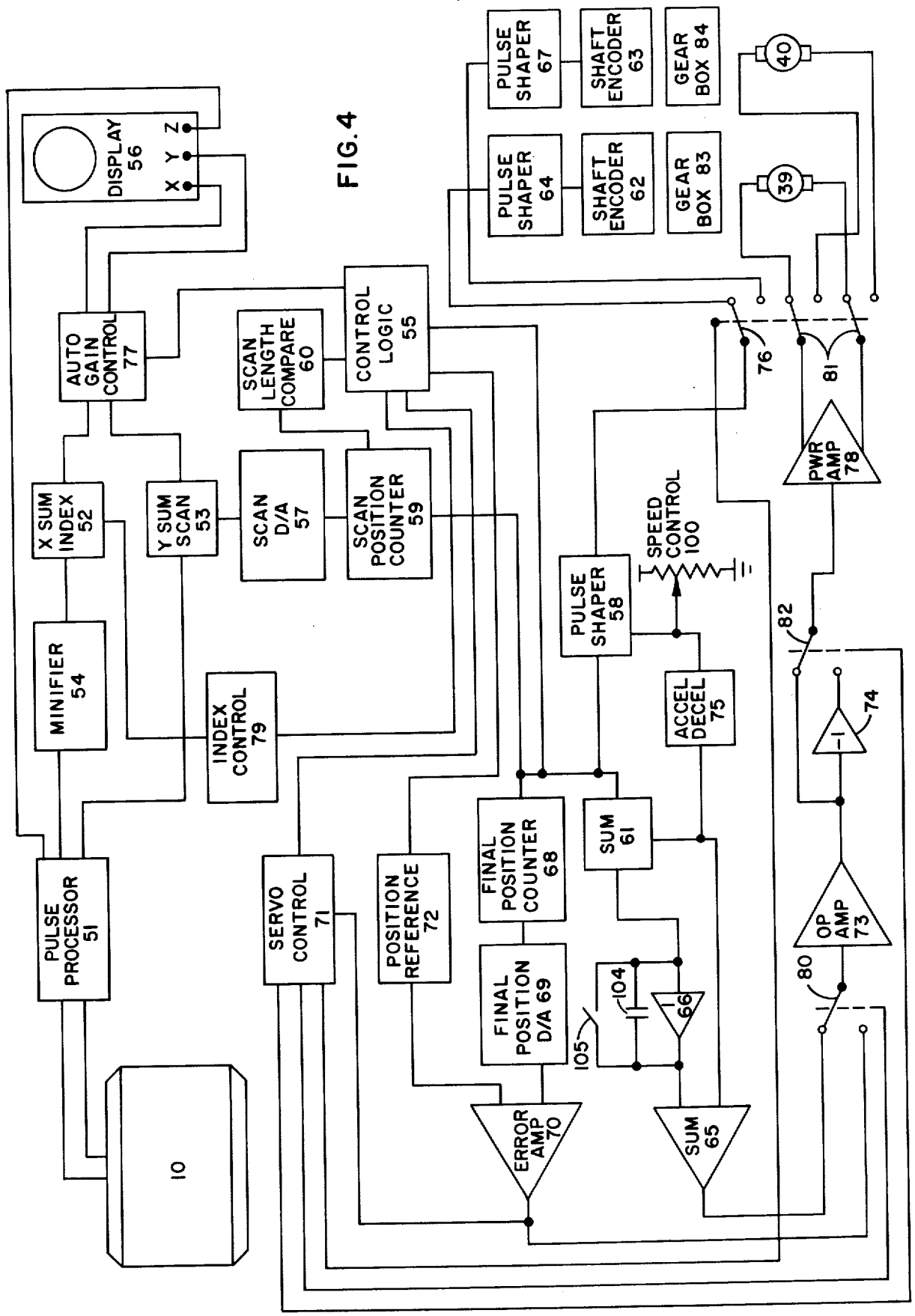

A chain 36 forms a closed loop and is engaged adjacent to the end members 38 of the carriage support 43 by gears which are fastened at rotatable pivots fixed with respect thereto. A motor 39 is coupled through a gear box to one of these gears and may be rotated in either direction to cause progression of the chain 36 in either a clockwise or counterclockwise direction. The chain 36 itself is fastened to the carriage 22 at connection points 108 as illustrated in FIG. 2. The carriage 22 may thereby be moved along the length of the transverse rails 21 and in a direction transverse to the longitudinal rails 41. As illustrated in FIG. 4, position sensing means in the form of shaft encoders 62 and 63 sense the position of the detector head 10 in the rectangular coordinate system illustrated in FIG. 5 and produce corresponding electrical detector position signals. Collectively, the elevated longitudinal rails 41, the carriage support assembly 43, the carriage 22, the translation inducing means and the shaft encoders 62 and 63 form an elevated detector positioning means for generating electrical signals corresponding to the position of the detector head 10 in a lateral plane.

Figure 5:
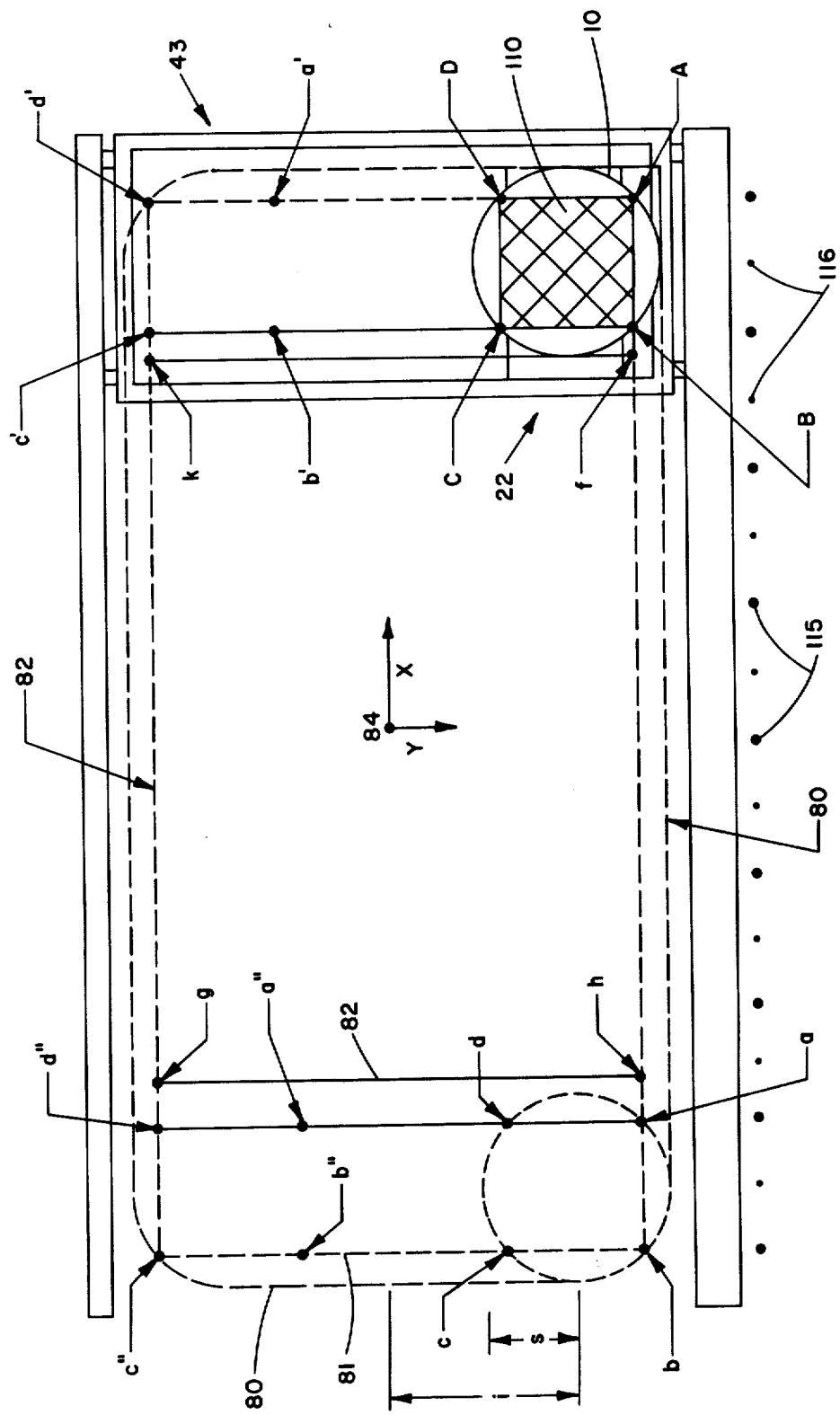

The scanning patterns for the detector head 10 which are normally employed using the present invention are best illustrated in FIG. 5, which is a view directed upward from beneath the overhead gantry system. The detector may be laterally positioned for storage at any convenient position, but upon initiation of a scan, moves to a starting position. The starting position from which the detector head 10 normally begins its scanning pattern may be considered to be the lower right hand position illustrated in FIG. 5. This position is the furthest position from the point 84 to which the detector head 10 may move in the lower right hand quadrant in the rectangular matrix indicated having a center 84. This center 84 of the rectilinear coordinate system illustrated coincides with the center of the gantry system and will at all times be located at the center of the image produced in the image recordation device 56 for whole body imaging.

The detector head 10 is of a conventional type employing a disc-shaped scintillation crystal which appears in circular form in FIG. 5. The outer boundary of the viewing area of the detector 10 as it moves between the positions most distant from the center 84 is illustrated by the boundary 80 in FIG. 5. To ensure that each portion of the patient's body appears in the detector's field of view for the same amount of time, physical masking or electronic masking circuitry is employed to define boundaries enclosing a rectangular radioactive emission registration portion of the scintillation crystal defined by the cross-hatched area 110 having corners A, B, C and D. The electronic masking circuitry employed may be that described in U.S. Pat. No. 3,655,974, whereby signals representing the occurrence of radioactive emissions falling outside of the boundaries of area 110 are suppressed and not recorded in the image recordation means 56. While the area 110 may be of any rectangular configuration, a square geometry is employed in the embodiment of FIG. 5.

In the fist scan pass of the detector 10, the detector moves from the lower right hand quadrant to the lower left hand quadrant with respect to the rectangular coordinate system illustrated. As the detector head 10 progresses on its scanning path, it can be seen that the maximum area which the detector can view and from which scintillations will be recorded is defined by the rectangular perimeter 81 having as corners A, b, c'', and d'. The peripheral portions of this area in which the detector dwells while it undergoes a change in direction of translation will be exposed to the scintillation crystal for a longer period of time than will the interior portions of the area. This inequality of exposure time would result in distortions at the affected portions of the perimeter of the recordable viewing area. Accordingly, it becomes desirable to utilize as an expanded field of view only those portions of the viewing area having a uniform exposure to the emission registration portion 110 of the crystal. This usable expanded field of view, termed the field of interest or expanded field of view, is defined by the path 82 having as corner points $f, h, g$ and $k$. The reason that this expanded field of view is not extended more at each end and thereby defined by the points $B, a, d''$ and $c'$ is because of the acceleration and deceleration of the detector head 10 at either end of the viewing area 80. This acceleration and deceleration create areas of non-uniform viewing. Within the expanded field of view 82, however, the speed of the detector head 10 is uniform at all times. The detector head 10 is thereby moved within a viewing area 80 to define an expanded rectilinear field of view 82 bounded by predetermined limits whereby the detector head 10 views a segment of the viewing area which varies with the lateral position of the detector head. The detector positioning means is this manner laterally moves the detector such that the emission registration portion 110 of the crystal lies beyond the expanded field of view 82 when the detector 10 undergoes a change in direction of translational motion, as illustrated in FIG. 5. That is, the detector registration portion 110 of the crystal, when at the end of a scanning pass, will lie within one of the rectangular areas A, B, $c', d'$ or $a, b, c'', d''$. These areas do not lie within the field of interest and counts detected therein are not registered in the recorder 56.

The detector registration portion 110 of the crystal begins its scanning pattern at the position indicated by the corner points A, B, C and D. Thereafter the translation inducing means moves the detector head 10 in accordance with its scanning pattern, and the detector head moves in the negative X direction until the emission registration portion 110 of the scintillation crystal reaches the position bounded by the designations $a, b, c$ and $d$. The translation inducing means will thereby index the detector head by a predetermined indexing increment perpendicular to the scanning direction at the end of each scan. Continuing the foregoing example, the detector head would be indexed by a predetermined increment $i$, in the negative $y$ direction. There is provided a manually adjustable scan width or index control circuit which may be adjusted to one of several settings by means of push buttons in the control logic 55 in FIG. 4. This manually adjustable index control circuit is connected to the translation inducing means and is used to vary the indexing increment imparted to the detector head. For example, an indexing increment of $s$ in FIG. 5 would provide for 50% overlapping scanning.

To lend perspective to the image produced, especially where, by operator selection, scanning is conducted for imaging less than the entire expanded field of view, a calibration circuit is provided in the control logic to pass signals representing ascertainable location points 115 and 116 within the viewing area to the image display.

FIG. 4 illustrates the type of electronic circuitry necessary to achieve the required translational motion and signal processing. The motor 40 drives the carriage support 43 back and forth in scanning passes in the positive and negative X directions through a gear speed reducer, a clutch, sprockets, and a single fixed length of chain. The motor 39 drives the carriage 22 transversely along the $y$ axis. The motor 39 employs a gear speed reducer, a clutch, a closed loop of chain, and sprockets. Optical incremental shaft encoders 62 and 63 are used in conjunction with motors 39 and 40 as part of a detector position sensing mechanism for obtaining position information in the rectangular coordinate system of FIG. 5. Additional flexibility available to the operator is to interchange scan and index axes by driving the motor 40 for index passes and the motor 39 for scan passes. Operation in this manner can be effected by a simple wiring change in the embodiment of FIG. 4.

The prime function of the detector position sensing means of this invention is to sense the position of the detector 10 in the coordinate system of FIG. 5 and to provide corresponding electrical detector position signals. As previously stated, the detector position sensing means is comprised of the shaft encoders 62 and 63 each associated with a respective one of the shafts of motors 39 and 40. The shaft encoders 62 and 63 generate electrical pulses corresponding to revolutions of the associated motor shafts, which in turn correspond to positions in the coordinate system of FIG. 5.

The electrical signals from shaft encoders 62 and 63 are passed to pulse shaping networks 64 and 67 respectively. A directional selection switch 76 alternatively connects either the shaft encoder 62 or the shaft encoder 63 to the pulse shaping network 58. The output of pulse shaper 58 is transmitted to the summation circuit 61, the final position counter 68, and the scan position counter 59.

The ultimate control of scanning parameters of the system rests with the equipment operator, who can select the number of passes to be made over a patient by the detector head 10 and the length of the passes. This information is typically entered into the system by means of push button controls in the control logic unit 55. As this information is entered, the control logic unit 55 sets the control points at which it will respond to signals from scan length comparator 60 and the index control 79. The index control circuit 79 is adjustable and is connected to the translation inducing mechanism through the control circuit 55 to vary the indexing increment imparted to the detector head 10.

The $x$ and $y$ position signals from the conventional pulse processor electronics 51 are minified by means of a minification amplifier circuit 54. Adviseably, the minification is such that a 4 volt peak to peak signal from processor electronics 51 corresponds to a 200 centimeter distance. After minification, the $x$ position signal is combined with the index position signal from index control 79 in the $x$ sum index unit 52. Likewise, the minified $y$ position signal is combined with the scan position signal from the scanning digital-to-analog converter 57 in the $y$ sum index unit 53. The output signals from the summing units 52 and 53 are passed to the automatic gain control unit 77 which receives a control signal from the control logic 55 so that an image of constant size is formed on the display unit 56, whatever the control settings in the control logic 55. The scan position signal from the D/A converter 57 is obtained from the scan position counter 59. The counter 59 is digitally incremented or decremented by each electrical detector position signal received from the shaft encoders 62 and 63 which are produced as the detector head 10 is scanned across the viewing area. The digital reading from the scan position counter 59 is continually compared against the scan limit setting contained therein by the scan length comparator 60. The scan length comparator 60 receives one input from the counter 59, while the other input is received from control logic 55 at the time that the scanning parameters are set. The index position signal from the index control 79 is a fixed level signal corresponding to the scan pass position along the index or $y$ axis. This fixed level signal is set by control logic 55 at the beginning of a scan pass, since the index position remains fixed during the scan pass.

The electrical servo loop under the control of servo control 71 is essentially a two mode servo providing speed regulation during a scan pass and position control when approaching a final position. A digital signal is set in the final position counter 68 indicative of the digital representation of the final desired position of the detector head by means of a signal control logic 55. A comparator circuit in the counter 68 compares the actual position with the final position desired, and when this final position has been achieved, counter 68 transmits its position signal to a digital to analog converter 69, which in turn transmits the signal as one input to error amplifier 70. The other input to error amplifier 70 is a position reference signal from reference voltage selector 72, which in turn is set by control logic unit 55.

The output of error amplifier 70 is transmitted to a mode switching circuit 80 and to servo control unit 71. Error amplifier 70 thereby passes mode control signals to the servo control circuit 71. Servo control unit 71 controls the operation of switches 76, 80, 81 and 82. By operation of the switch 80, the power controller or amplifier 78 may be alternatively be connected to either the speed control circuit 100 or the position control circuit formed by the final position counting circuit 68, the error amplifier 70, the digital to analog converter 69, and the position reference circuit 72. In addition, operation of switches 81 controls the direction in which the detector head 10 is driven in the co-ordinate system of FIG. 5. The initial operation of the movement of the detector head 10 is in the positional mode. Switch 80 is at that time in the contact condition opposite to that illustrated in FIG. 4. The signal from the error amplifier 70 is passed to the operational amplifier 73 and either through or around the inverting amplifier 74, depending upon the direction in which the detector head must travel to reach the starting position. This circuit is determined by switch 82 which is governed in operation by servo control 71.

The signal from operational amplifier 73 is then passed to a power control means in the form of a power amplifier 78 which actuates operation of the motors 39 or 40 in response to operation of the switches 81 under the control of servo control 71. It is to be understood that the appropriate gear box and drives 83 and 84 are respectively associated with the motor and shaft encoder combinations 39–62 and 40–63. It should be noted that switches 81 and 76 are operated in tandem so that positional information is always obtained from the shaft encoder associated with the actuated motor. Operation in this manner continues until the change in position is such that the detector head 10 reaches its starting position, at which time the output from error amplifier 70 is zero. This indicates to the servo control 71 that the mode of operation should be changed from positional to speed by reversal of the switch 80 to the position illustrated. In this mode of operation, the positional information from the shaft encoders 62 and 63 are passed to the summation circuit 61, the output of which is passed through an integrating circuit including an integrating amplifier 66, a capacitor 104, and a dump switch 105. This integration circuit produces an increasing signal which maintains equality with the other input to summing circuit 65. The rate of increase is controlled by acceleration/deceleration control 75 which in turn is controlled by the speed control circuit 100. The input to summing circuit 61 from control 75 insures that the rate of integration of the positional signal is synchronized with the allowable acceleration rate. Once the input to summing amplifier 65 reaches the constant amplitude established by the operator selected speed control circuit 100, the output of summing amplifier 65 remains constant and the switch 105 of the integration circuit is reset. Upon nearing the end of the longitudinal or transverse pass, the signal from the error amplifier 70 causes servo control 71 to actuate the acceleration/deceleration control 75 to decelerate the speed of the detector head. Accordingly, the output of the summming circuit 65 is decreased to decrease the input to the power amplifier 78. Thereafter, the servo control again reverses switch 80 so that the system again operates in the positional mode. It can be seen that by this manner of operation the motor shafts are alternatively governed by either the position control circuit or the speed control circuit. Referring again to FIG. 2 there is disclosed a spring balance device which comprises a low friction fulcrum 23 fastened to the carriage assembly 22 about which a member 26 pivots. The member 26 is thereby supported on the carriage 22. At one end, the member 26 is connected to the scintillation detector head 10 by means of the gear 25 and the chain 27. Balancing forces are applied at the other end of member 26 by means of main spring 30 and booster spring 31. The vertical limit switches 34 at the actuating extension 35 of the member 26 are mounted on the carriage 22. These limit switches 34 are provided to indicate that the forces of the main spring 30 and booster spring 31 are out of balance with the mass of the detector head 10, the yoke 13, and the column 15. If while operating main vertical motor 28 an out of balance condition is sensed by the limit switches 34, then the limit switches 34 will limit the operation of the motor 28 to allow vertical movement only in the direction which would restore balance. To achieve balance when the weight of the detector 10 is changed, such as would occur when changing collimators, a balance restoring mechanism provided which extends or compresses the booster spring 31 by way of appropriate operation of the booster spring control motor 29 until an optimum balance of forces is re-established. In this manner the actuating extension 35 is re-positioned mid-way between the limit switches 34. A dash pot 33 dampens any motion induced in the member arm 26.

In addition to the foregoing function, the vertical limit switches 34 also perform a safety function. That is, they inhibit vertical motion when a force in excess of a few pounds is exerted against the detector head. Such a force would occur if the detector head were pressed against a patient or against the unerside of table 221 with more than a few pounds of force.

The embodiment and mode of operation of the invention depicted herein have been given for purposes of illustration only, and other alternative modified forms of the invention will be obvious to those familiar with scintillation cameras and radiation scanning. Accordingly, the illustrated embodiment should not be considered limiting to the scope of this invention.

We claim:
1. A gantry supported scanning scintillation camera system comprising:
   a scintillation camera emloying a movable detector head and detached signal processing and image recording means;
   an elevated gantry support from which said detector head is suspended, said gantry support comprised of a pair of parallel longitudinal rails, a carriage support assembly supported by and spanning the distance between said longitudinal rails and longitudinally positionable with respect thereto and comprising a pair of parallel rails transverse with respect to said longitudinal rails, a carriage assembly supported by said carriage support ssembly and carrying said detector head and positionable along the length of said carriage support assembly, and separate drive units each employing a rotating motor shaft and motion conversion means to convert the rotational motion of the motor shaft to translational movement, said drive units respectively driving said carriage support assembly along said longitudinal rails and driving said carriage along said transverse rails;
   translation inducing means for laterally moving said detector head within a viewing area to define an expanded rectilinear field of view bounded by predetermined limits whereby said detector head views a segment of said viewing area which varies with the lateral position of said detector head;
   detector position sensing means for generating electrical signals corresponding to the lateral position of said detector head within said viewing area said detector position sensing means comprised of separate shaft encoders each associated with a respective one of said motor shafts and each generating electrical pulses corresponding to revolutions of the associated motor shaft, pulse counting means associated with said shaft encoders for tabulating said electrical pulses in proportion to the number of revolutions of said motor shafts, whereby said pulse counting means is incremented in response to motor shaft rotation in one direction and decremented in response to shaft rotation in the opposite direction, digital to analog conversion means associated with said counting means to collectively and proportionally produce from the tabulated pulse counts therein the aforesaid electrical signals corresponding to the lateral position of the detector head; and signal combining means receiving input signals from said signal processing unit and from said detector position sensing means to provide composite output signals to said image recording means representing the locations within said expanded field of view fom which radiation emanates.

2. The apparatus of claim 1 wherein there is further provided a power control means, a speed control circuit for producing an analog speed selection signal of amplitude proportional to a desired speed, a position control circuit for producing mode control signals, a mode switching circuit, a servo control circuit for receiving mode control signals from said position control circuit and for actuating said mode switching circuit to alternatively connect said power control to either said speed control circuit or said position control circuit, whereby the rotation of said motor shafts is alternatively governed by said position control circuit or said speed control circuit.

3. The apparatus of claim 1 wherein there is provided a scan length comparator circuit control light logic including an adjustable scan length selection circuit connected to said scan length comparator circuit through said control logic and a scan position counter is connected to said scan length comparator circuit, the output of which provides an indexing signal to said translation inducing means through said control logic.

4. The apparatus of claim 3 wherein said image recording unit includes an adjustable minification means which is operatively controlled by said scan length selection circuit.

5. A gantry supported scanning scintillation camera employing a movable detector head and detached signal processing and image recording means, an elevated gantry support from which said detector head is suspended; translation inducing means for laterally moving said detector head within a viewing area to define an expanded rectilinear field of view bounded by predetermined limits whereby said detector head views a segment of said viewing area which varies with the lateral position of said detector head, wherein said translation inducing means moves said detector head within said viewing area between extreme positions therein in a first lateral scanning direction and indexes said detector head by a predetermined indexing increment in a lateral direction perpendicular to said scanning direction at the end of each scan, and there is provided an adjustable index control circuit connected to said translation inducing means to vary the indexing increment imparted to the detector head; detector position sensing means for generating electrical signals corresponding to the lateral position of said detector head within said viewing area, and signal combining means receiving input signals from said signal processing unit and from said detector position sensing means to provide composite output signals to said image recording means representing the locations within said expanded field of view from which radiation emanates.

6. A scintillation detector system for medical diagnostic imaging of radioisotopes injested by a patient comprising:
   a. a scintillation camera employing a detector head utilizing a planar scintillation crystal for detecting the occurrence of radioactive emissions and having an image recordation means for storing information representing the interaction of radioactive emissions with said scintillation crystal in a two dimensional co-ordinate system encompassing said scintillation crystal,
   b. an elevated detector positioning means from which said detecor head is suspended for laterally moving said detector head relative to a patient within a viewing area to define an expanded field of view bounded by predetermined limits and for generating electrical signals corresponding to the position of said detector in a lateral plane,
   c. signal combining means receiving electrical input signals from said detector head and from said detector positioning means to provide output signals to said image recordation means representing the relative position of radioactive emissions within the aforesaid expanded field of view, and
   d. masking circuitry to electronically define boundaries enclosing a rectangular radioactive emission registration portion of said scintillation crystal whereby signals representing the occurrence of radioactive emissions falling outside of said boundaries are supressed and not recorded in said image recordation means.

7. The apparatus of claim 6 wherein said detector positioning means induces lateral translation of said detector in at least two directions such that said emission registration portion of said crystal lies beyond the expanded field of view when said detector undergoes a change in direction of translational motion.

8. A scintillation detector system for medical diagnostic imaging of radioisotopes injested by a patient comprising:
   a. a scintillation camera employing a detector head utilizing a planar scintillation crystal for detecting the occurrence of radioactive emissions and having an image recordation means for storing information representing the interaction of radioactive emissions with said scintillation crystal in a two dimensional co-ordinate system encompassing said scintillation crystal,
   b. an elevated detector positioning means from which said detector head is suspended for laterally moving said detector head relative to a patient within a viewing area to define an expanded field of view bounded by predetermined limits and for generating electrical signals corresponding to the position of said detector in a lateral plane,
   c. signal combining means receiving electrical input signals from said detector head and from said detector positioning means to provide output signals to said image recordation means representing the relative position of ratioactive emissions within the aforesaid expanded field of view, and
   d. a calibration circuit passing signals representing ascertainable location points within said viewing area to said image recordation means for registration thereon.

9. A scanning scintillation camera system for medical diagnostic imaging of radionuclides comprising in combination:
   a. an elevated framework;
   b. a carriage support means supported by said elevated framework and longitudinally positionable with respect thereto,
   c. a carriage supported by and positionable lengthwise with respect to said carriage support means, d. a scintillation detector employing a planar scintillation crystal for detecting radioactive events and for generating light emissions in response thereto, a plurality of photodetectors in optical communication with overlapping areas of said scintillation crystal for generating electrical pulses in response to light emissions from said scintillation crystal, and pulse amplification circuitry for amplifying pulses from said photodetectors, e. detector suspension means connecting said detector to said carriage, f. translation actuating means operably connected to said carriage support, said carriage and to said detector suspension means for moving said carriage support, said carriage and said detector suspension means, and hence said detector, in mutually perpendicular directions, g. pulse matrixing circuitry for producing electrical output position signals representing the locations within the scintillation crystal from which light emissions emanate in a two dimensional co-ordinate system encompassing the scintillation crystal, h. position sensing means for sensing the position of said detector in the aforesaid co-ordinate system and for producing corresponding electrical detector position signals, i. signal combining means for combining said output position signals and said detector position signals to produce co-ordinate recordation signals for detected radioactive events, and j. recordation means for receiving said co-ordinate recordation signals and for providing an integral record of detected radioactive events.

10. The apparatus of claim 9 in which said detector suspension means is comprised of a yoke within which said detector is rotatably mounted, a vertically extensible telescoping column connected between said detector support means and said yoke, and column immobilizing means for locking said colum at a selected length.

11. The apparatus of claim 10 further comprising an intermediate supporting structure interposed between said column and said yoke and rotatable about the axis of said column.

12. The apparatus of claim 10 further comprising balance correction means operatively connected to said column to maintain said column in a balanced condition despite weight changes in the detector.

13. The apparatus of claim 12 wherein said balance correction means comprises a fulcrum located on said carriage, a counterbalance arm bearing the weight of said scintillation detector at a distance spaced from said fulcrum and supported on said carriage at said fulcrum, out of balance limit switches mounted on said carriage and operatively associated with said counterbalance arm at a locaton distant from said fulcrum, adjustable spring biasing means countering the weight of said scintillation detector and connected between said carriage and said counterbalance arm at a location distant from said fulcrum, whereby adjustments of said spring biasing means may be made to compensate for weight changes in the detector to thereby maintain said column in a balanced condition.

14. The apparatus of claim 12 wherein vertical limit switches are provided to inhibit vertical motion when an excessive force is exerted against the detector head.

15. A scanning scintillation camera system comprising: a patient support means and a scintillation camera detector head means respectively movable with respect thereto and detached scintillation camera signal processing and image recording means, a support upon which one of said detector means and said patient support means is mounted, translation inducing means for laterally moving said support within a viewing area to define an expanded rectilinear field of view bounded by predetermined limits whereby said detector head means views a segment of said viewing area which varies with the lateral position of said detector head means relative to said patient support comprising a pair of parallel longitudinal rails, a carriage support assembly supported by and spanning the distance between said longitudinal rails and longitudinally positionable with respect thereto and comprising a pair of parallel rails transverse with respect to said longitudinal rails, a carriage assembly supported by said carriage support assembly and carrying said support and positionable along the length of said carriage support assembly, and separate drive units each employing a rotating motor shaft and motion conversion means to convert the rotational motion of the motor shaft to translational movement, said drive units respectively during said carriage support assembly along said transverse rails, detector position sensing means for generating electrical signals corresponding to the lateral position of said detector head relative to said patient support means within said viewing area comprising: separate shaft encoders each associated with a respective one of said motor shafts and each generating electrical pulses corresponding to revolutions of the associated motor shaft, a separate pulse counter associated with each shaft encoder for tabulating said electrical pulses in proportion to the number of revolutions of the associated motor shaft, whereby each counter is incremented in response to motor shaft rotation in one direction and decremented in response to shaft rotation in the opposite direction, digital to analog conversion means associated with each of the aforesaid counters to collectively and proportionally produce from the tabulated pulse counts therein the aforesaid electrical signals corresponding to the lateral position of the detector head, and signal combining means receiving input signals from said signal processing means and from said detector position sensing means to provide composite output signals to said image recording unit representing the locations within said expanded field of view from which radiation emanates.

16. The apparatus of claim 15 wherein there is further provided a scanning speed regulator comprising a speed selection circuit for producing an analog speed selection signal of amplitude proportional to a desired speed, a frequency to signal amplitude converter associated with at least a selected one of said shaft encoders for producing a speed indication signal, a comparator circuit for comparing said speed indication signal, a comparator circuit for comparing said speed indication signal and said speed selection signal and for producing as an output a polarized control signal, and a servo-adjusting mechanism responsive to said control signal for adjusting the speed of the motor shaft associated with each selected shaft encoder.

17. The apparatus of claim 15 wherein there is provided a scan length comparator circuit and an adjustable scan length selection circuit connected to said scan length comparator circuit and at least one of the aforesaid pulse counters is connected to said scan comparator circuit, the output of which provides an indexing signal to said translation inducing means when a signal from one of the aforesaid pulse counters at least achieves a threshold proportional to a signal from said scan length selection circuit.

18. The apparatus of claim 15 wherein a calibration circuit passes signals representing ascertainable location points within said viewing area to said image recordation means for registration thereon.

* * * * *